(12) United States Patent
Wada et al.

(10) Patent No.: US 12,072,905 B2
(45) Date of Patent: Aug. 27, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Hiroho Wada, Yokohama Kanagawa (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 17/446,287

(22) Filed: Aug. 27, 2021

(65) Prior Publication Data

US 2022/0179874 A1    Jun. 9, 2022

(30) Foreign Application Priority Data

Dec. 3, 2020    (JP) ................................ 2020-201101

(51) Int. Cl.
*G06F 16/25* (2019.01)
*G06F 16/215* (2019.01)
*G06F 16/22* (2019.01)

(52) U.S. Cl.
CPC ......... *G06F 16/258* (2019.01); *G06F 16/215* (2019.01); *G06F 16/2237* (2019.01)

(58) Field of Classification Search
CPC ... G06F 16/258; G06F 16/2237; G06F 16/215
USPC ........................................................ 707/756
See application file for complete search history.

(56) References Cited

U.S. PATENT DOCUMENTS

| | | | | |
|---|---|---|---|---|
| 7,533,313 | B1* | 5/2009 | Retersdorf | G01R 31/2894 714/724 |
| 8,437,534 | B2* | 5/2013 | Shibuya | G01N 21/956 700/28 |
| 9,946,165 | B2* | 4/2018 | Ypma | G03F 7/70641 |
| 2006/0010416 | A1* | 1/2006 | Keck | G06Q 10/06 700/121 |
| 2018/0308223 | A1* | 10/2018 | Zeng | G06F 16/258 |
| 2019/0095472 | A1* | 3/2019 | Griffith | G06F 16/2456 |
| 2020/0034347 | A1* | 1/2020 | Selly | G06F 17/16 |

(Continued)

FOREIGN PATENT DOCUMENTS

JP        2019-092101 A    6/2019
WO    WO 2017/141802 A1    8/2017

*Primary Examiner* — Giovanna B Colan
(74) *Attorney, Agent, or Firm* — Finnegan, Henderson, Farabow, Garrett & Dunner, LLP

(57) ABSTRACT

An information processing device converts a plurality of original data arranged on a preset n-dimensional map into a plurality of new data arranged on a map according to a conversion rule. In the conversion rule, when an original datum at a target position on the map has a value of out-of-criterion, a new datum at the target position is set to the value of the original datum at the target position, and when the original datum at the target position has a value of within-criterion, each of values of one or more original data excluding an original datum having a value of the out-of-criterion from original data included in a reference region is selected to perform majority voting with the values of the one or more original data selected, and the new datum at the target position is set to a value determined by the majority voting.

11 Claims, 14 Drawing Sheets

(56) References Cited

U.S. PATENT DOCUMENTS

2021/0097192 A1\* 4/2021 Wada .................... G06F 16/285
2021/0182587 A1\* 6/2021 Akiyama ................. G06T 5/70

\* cited by examiner

FIG.6
PLURALITY OF ORIGINAL DATA
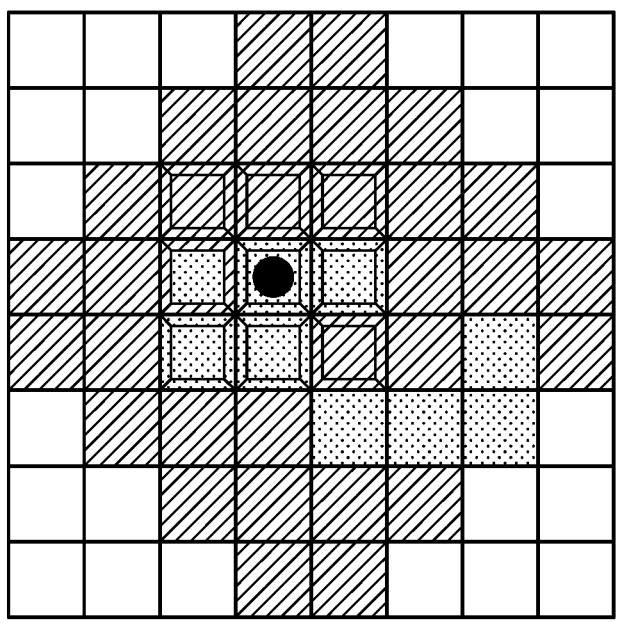
REFERENCE REGION
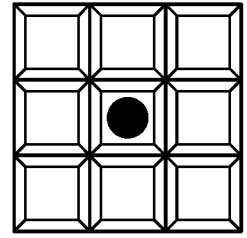

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-201101, filed on Dec. 3, 2020; the entire contents of which are incorporated herein by reference.

FIELD

Embodiments described herein relate generally to an information processing device, an information processing method, and a computer program product.

BACKGROUND

There have been cases where a requester company requests analysis of a data group from an external analysis company. For example, a chip manufacturing company may request an external analysis company to analyze wafer maps representing defective or non-defective for each chip. The analysis company performs, for example, clustering of a large number of wafer maps to analyze causative factors of defects and the like.

Here, in a case where the data group is provided to the external analysis company as it is, confidential information may be leaked to the outside. Therefore, the requester company wants to process the data group to be analyzed so that the confidential information is not leaked, and provide the processed data group to the external analysis company. For example, the chip manufacturing company wants to provide the external analysis company with the wafer maps that have been processed so that the yield of chips is not leaked.

However, if the data group is processed inappropriately, the correct analysis result cannot be obtained. Therefore, the requester company needs to appropriately convert the data group so as not to leak confidential information and to reduce the influence on the analysis result. Conventional technologies are described in WO Publication No. 2017/141802 and Japanese Patent Application Laid-open No. 2019-092101, for example.

BRIEF DESCRIPTION OF THE DRAWINGS

FIG. 6 is a diagram illustrating an example of a reference region;

DETAILED DESCRIPTION

According to an embodiment, an information processing device converts a first data group including a plurality of data arranged on a preset n-dimensional map, n being an integer of 1 or larger, into a second data group including a plurality of data arranged on the map. The device includes a hardware processor configured to: acquire the first data group as a plurality of original data; output a conversion rule; convert the plurality of original data into a plurality of new data arranged on the map according to the conversion rule; and output the plurality of new data as the second data group. Each of the plurality of original data and the plurality of new data has any one of a first predetermined number of values indicating within-criterion or a second predetermined number of values indicating out-of-criterion, the first predetermined number being two or more, the second predetermined number being one or more. In the conversion rule, in a case where an original datum at a target position on the map has a value of the out-of-criterion, a new datum at the target position is set to the value of the original datum at the target position, and in a case where the original datum at the target position has a value of the within-criterion, each of values of one or more original data excluding an original datum that has a value of the out-of-criterion from two or more original data included in a reference region that is a predetermined area based on the target position is selected to perform majority voting with the values of the one or more original data selected, and the new datum at the target position is set to a value determined by the majority voting.

A conversion device 10 according to an embodiment will be described with reference to the drawings.

Figure 1:
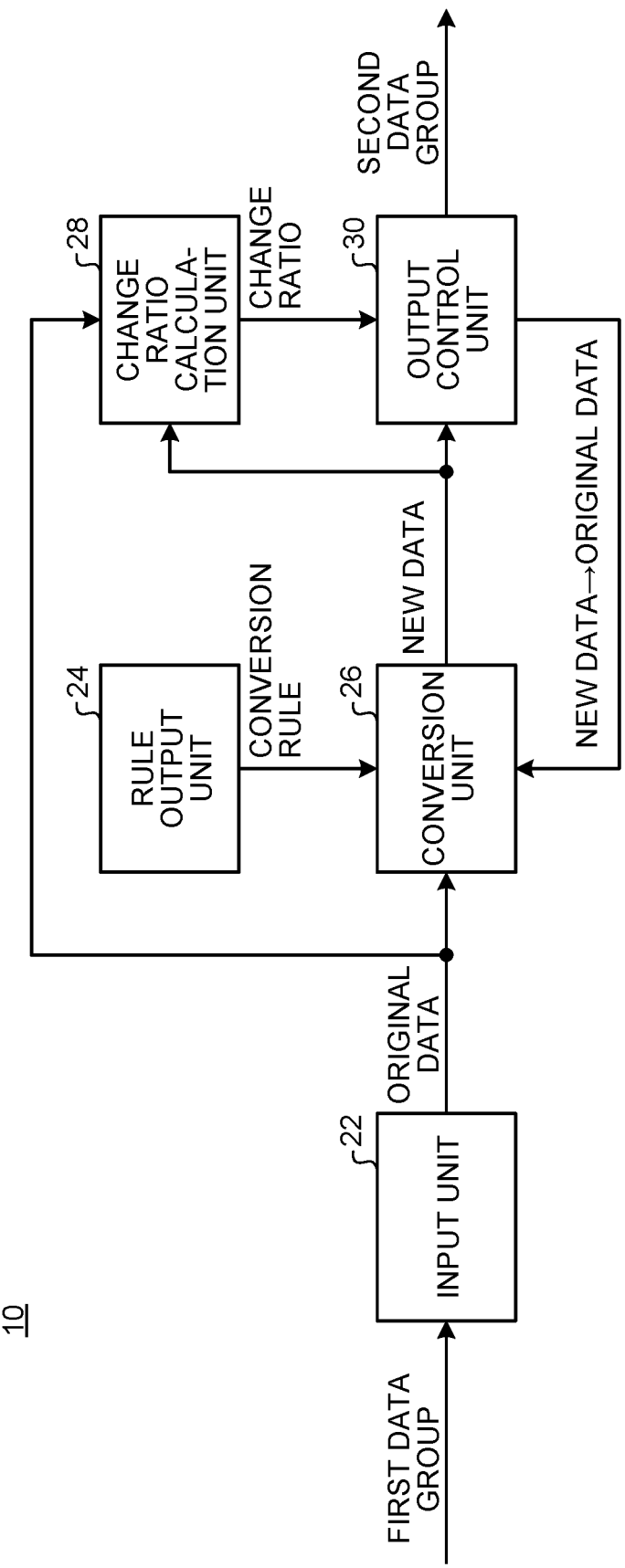
FIG. 1 is a diagram illustrating a functional configuration of a conversion device according to an embodiment.

FIG. 1 is a diagram illustrating a functional configuration of a conversion device 10. The conversion device 10 converts a first data group including a plurality of data arranged on a preset n-dimensional map (n is an integer of 1 or larger) into a second data group including a plurality of data arranged on the same map. For example, the first data group is produced by a requester company. The conversion device 10 is used by the requester company. The conversion device 10 supplies the second data group to an external analysis company different from the requester company or the like.

The analysis company analyzes a plurality of the second data groups received from the requester company or the like.

In the present embodiment, the requester company is a chip manufacturing company, and the first data group is a wafer map indicating a value representing defective or non-defective for each chip. The analysis company receives a request from the chip manufacturing company, performs clustering on a large number of wafer maps, and analyzes causative factors of defects and the like at a chip manufacturing step.

The conversion device 10 is implemented by executing a conversion program by an information processing device that is a dedicated or general-purpose computer. The conversion device 10 is provided with a functional configuration as illustrated in FIG. 1 by executing the conversion program. That is, the conversion device 10 includes an input unit 22, a rule output unit 24, a conversion unit 26, a change ratio calculation unit 28, and an output control unit 30.

The input unit 22 acquires the first data group from another device. The input unit 22 gives the acquired first data group to the conversion unit 26 as a plurality of original data.

The rule output unit 24 outputs a preset conversion rule. The rule output unit 24 reads out information including the conversion rule from a memory, and gives the read information to the conversion unit 26. The conversion rule is a rule for converting the original data into a plurality of new data. The conversion rule is set in advance by, for example, an administrator or a designer.

The conversion unit 26 receives the conversion rule. In a case where the conversion unit 26 has received the original data, the conversion unit 26 converts the original data arranged on the n-dimensional map into a plurality of new data arranged on the same map according to the conversion rule.

The change ratio calculation unit 28 calculates a change ratio representing a change ratio of the new data output from the conversion unit 26 to a plurality of data included in the first data group. For example, the change ratio calculation unit 28 calculates, as a change ratio, a ratio of the number of data having values that have been changed among the new data to the number of data included in the first data group. For example, the change ratio calculation unit 28 may calculate, as a change ratio, a ratio of the number of data having values that have been changed among the new data to the number of data having a value of within-criterion in the first data group. The details of the value of within-criterion will be described later.

The output control unit 30 receives the new data from the conversion unit 26 and also receives the change ratio from the change ratio calculation unit 28. In a case where the received change ratio is smaller than a preset value, the output control unit 30 gives the received new data to the conversion unit 26 as a plurality of original data again. In a case where the conversion unit 26 has received the original data from the output control unit 30, the conversion unit 26 converts the original data received from the output control unit 30 into a plurality of new data according to the conversion rule. The output control unit 30 repeatedly converts the original data into the new data until the change ratio is equal to or larger than the preset value.

In the case where the change ratio is equal to or larger than the preset value, the output control unit 30 outputs the new data as the second data group.

Figure 2:
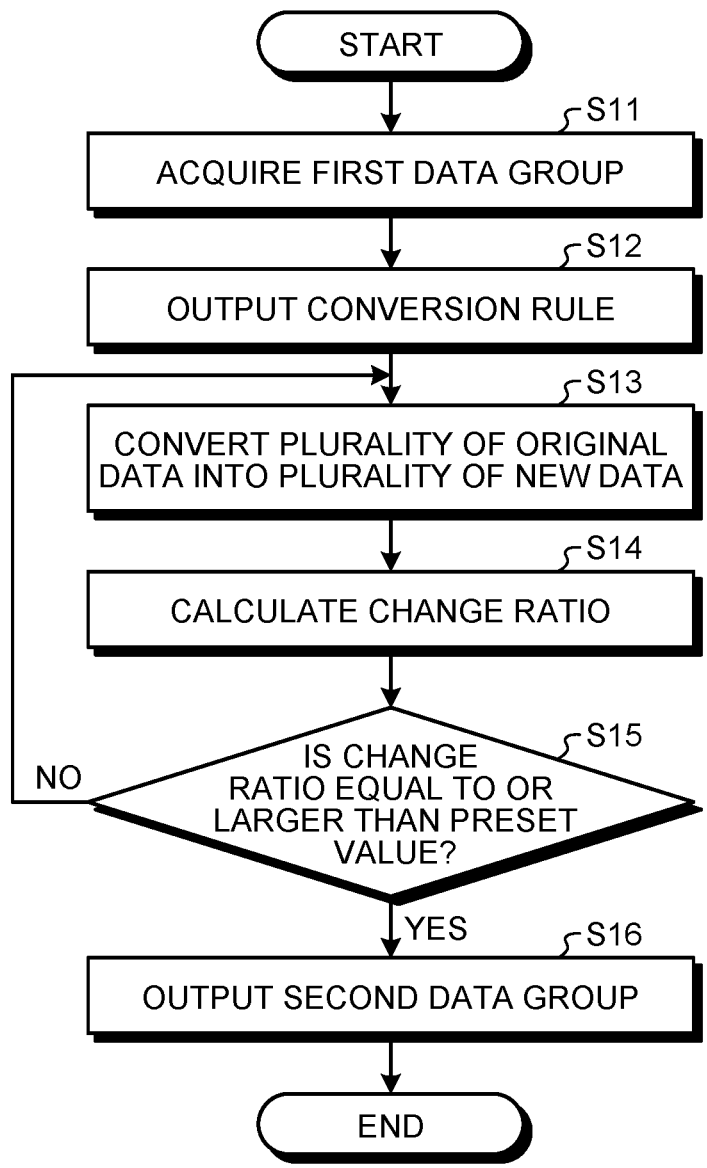
FIG. 2 is a flowchart illustrating a processing flow of the conversion device.

FIG. 2 is a flowchart illustrating a processing flow of the conversion device 10. The conversion device 10 executes processing according to the flow illustrated in FIG. 2.

First, at S11, the conversion device 10 acquires the first data group as a plurality of original data from another device. Subsequently, at S12, the rule output unit 24 of the conversion device 10 outputs a preset conversion rule.

Subsequently, at S13, the conversion device 10 converts the original data arranged on the n-dimensional map into a plurality of new data arranged on the same map according to the conversion rule. Subsequently, at S14, the conversion device 10 calculates a change ratio of the new data output from the conversion device 10 to a plurality of data included in the first data group.

Subsequently, at S15, the conversion device 10 determines whether or not the calculated change ratio is equal to or larger than a preset value. In a case where the calculated change ratio is smaller than the preset value (No at S15), the conversion device 10 returns the processing to S13. In a case where the processing is returned to S13, the new data are substituted with a plurality of original data, and the original data are converted into a plurality of new data according to the conversion rule.

In a case where the change ratio is equal to or larger than the preset value (Yes at S15), the conversion device 10 allows the processing to proceed to S16. At S16, the conversion device 10 outputs the new data as the second data group. When finishing the processing of S16, the conversion device 10 ends this flow.

The conversion device 10 as described above can output the second data group that has changed at the predetermined change ratio or larger with respect to the first data group. As a result, the conversion device 10 can conceal the contents of the first data group from a company or the like that acquires the second data group.

Figure 3:
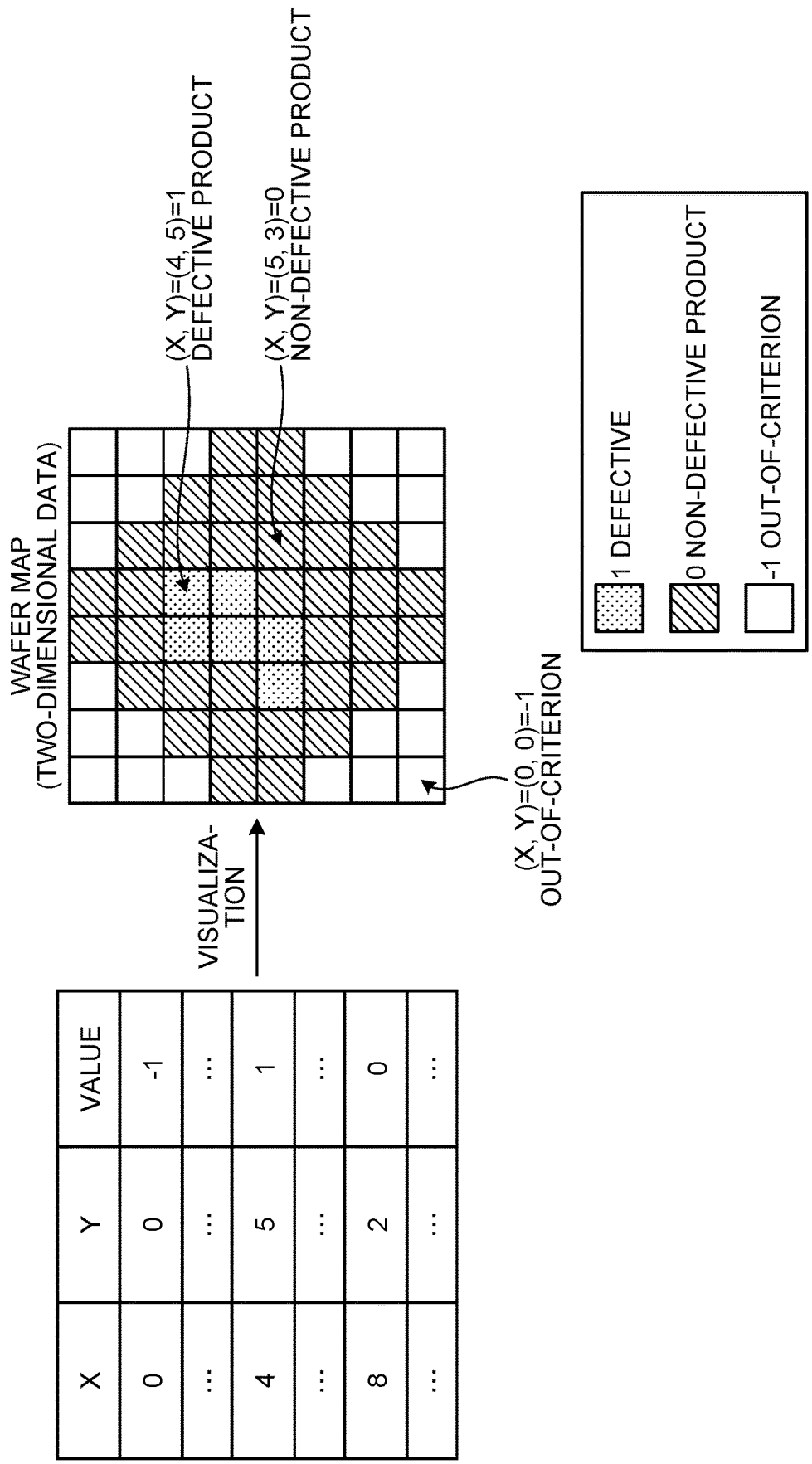
FIG. 3 is a diagram illustrating an example of a plurality of original data and a plurality of new data.

FIG. 3 is a diagram illustrating an example of a plurality of original data and a plurality of new data.

A plurality of original data and a plurality of new data are data groups arranged on the same map. For example, in a case where the original data represent a group including 64 data arranged in an 8×8 two-dimensional matrix-like map, the new data also represent a group including 64 data arranged in an 8×8 two-dimensional matrix-like map.

Each of the original data and each of the new data are specified by positions on the map. In a case where the original data are arranged on the 8×8 two-dimensional matrix-like map, each of the original data is specified by a column number (for example, a position in an X direction) and a row number (for example, a position in a Y direction).

Each of the original data and the new data is any one of a plurality of types of values. The types of values are not correlated with each other. Specifically, each of the original data and each of the new data is any one of a first predetermined number of values indicating within-criterion and a second predetermined number of values indicating out-of-criterion, where the first predetermined is two or more, and the second predetermined number is one or more.

In the present embodiment, the original data and the new data represent a wafer map. More specifically, each of the original data and the new data has a value indicating that a chip is produced at a corresponding position or a value indicating that a chip is not produced at a corresponding position. Furthermore, in a case where a chip has been produced at a corresponding position, each of the original data and the new data has a value indicating that the corresponding chip is non-defective or a value indicating that the corresponding chip is defective.

In the present embodiment, the value indicating that a chip is not produced at a corresponding position is −1. The value (−1) indicating that a chip is not produced at a corresponding position is an example of a value of out-of-criterion.

In the present embodiment, the value indicating that a chip is produced at a corresponding position and the chip is non-defective is 0. In the present embodiment, the value indicating that a chip is produced at a corresponding position and the chip is defective is 1. The value (0 or 1) indicating that a chip is produced at a corresponding position is an example of a value of within-criterion.

The value indicating within-criterion is any one of two or more types of values. In the present embodiment, the value indicating within-criterion is any one of two types of 0 and 1. However, the value indicating within-criterion may be any one of three or more types of values, for example, any of 0, 1, and 2.

The value indicating out-of-criterion is any of one or more types of values. In the present embodiment, the value indicating out-of-criterion is one type of −1. However, the value indicating out-of-criterion may be any of two or more types of values, for example, any of −1 and −2.

Figure 4:
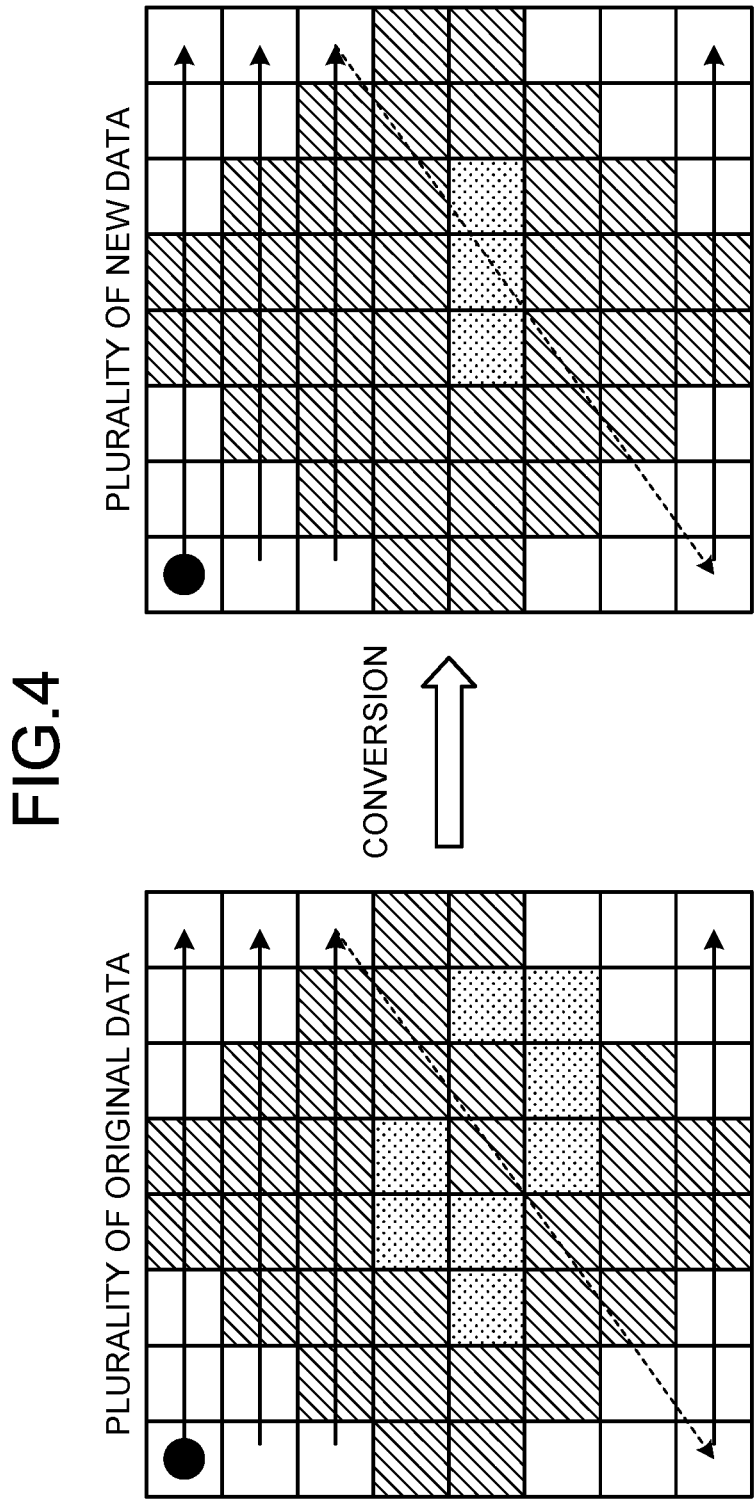
FIG. 4 is a diagram illustrating an example of a selection order of target positions at which data are converted.

FIG. 4 is a diagram illustrating an example of a selection order of target positions at which data are converted. In the present embodiment, the conversion device 10 selects one original datum among a plurality of original data and converts the selected original datum into a new datum at the same position on the map. For example, in a case where a plurality of original data and a plurality of new data are arranged on a two-dimensional matrix-like map, as illustrated in FIG. 4, a raster scan may be performed to select the original data one by one. The conversion device 10 may select the original datum in any order as long as every original datum can be selected once. The conversion device 10 may select two or more original data at the same time and execute conversion processing in parallel.

Figure 5:
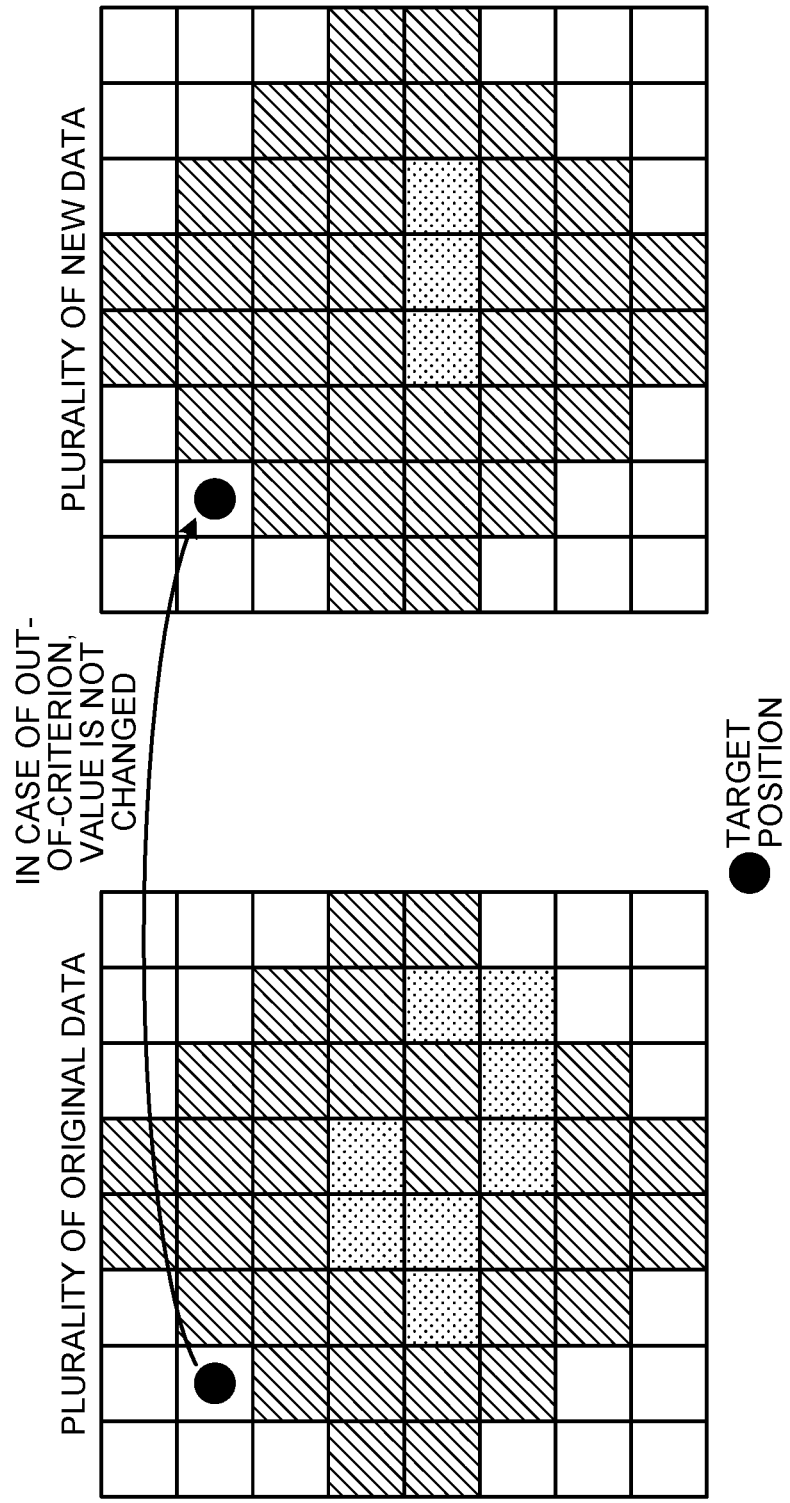
FIG. 5 is a diagram illustrating a conversion rule in a case where an original datum at a target position has a value of out-of-criterion.

FIG. 5 is a diagram illustrating a conversion rule in a case where the original datum at the target position has a value of out-of-criterion. As the conversion rule, at least a rule as illustrated in FIG. 5 is described. That is, the conversion rule describes that in a case where the original datum at the target position on the map has the value of out-of-criterion, a new datum at the target position is set to the value of the original datum at the target position.

For example, the conversion rule describes that in a case where the original datum at the target position is −1, a new datum at the target position is set to −1. As a result, the conversion unit 26 can substantially avoid executing the conversion processing on a datum having a value of out-of-criterion and execute conversion processing on a datum having a value of within-criterion.

FIG. 6 is a diagram illustrating an example of a reference region. The conversion rule describes that at least in a case where the original datum at the target position has a value of within-criterion, the reference region is specified. The reference region is a predetermined area based on the target position. More specifically, the reference region is a region including at least two or more data. Furthermore, the reference region is a region continuous with the target position on the map.

For example, in a case where the map is a two-dimensional matrix-like map, the reference region may be an area including a datum at a target position and eight data around and adjacent to the target position. The reference region may include the datum at the target position or need not include the datum at the target position. The reference region is not limited to such an area, and may be another area. Other examples of the reference region will be described later.

Figure 7:
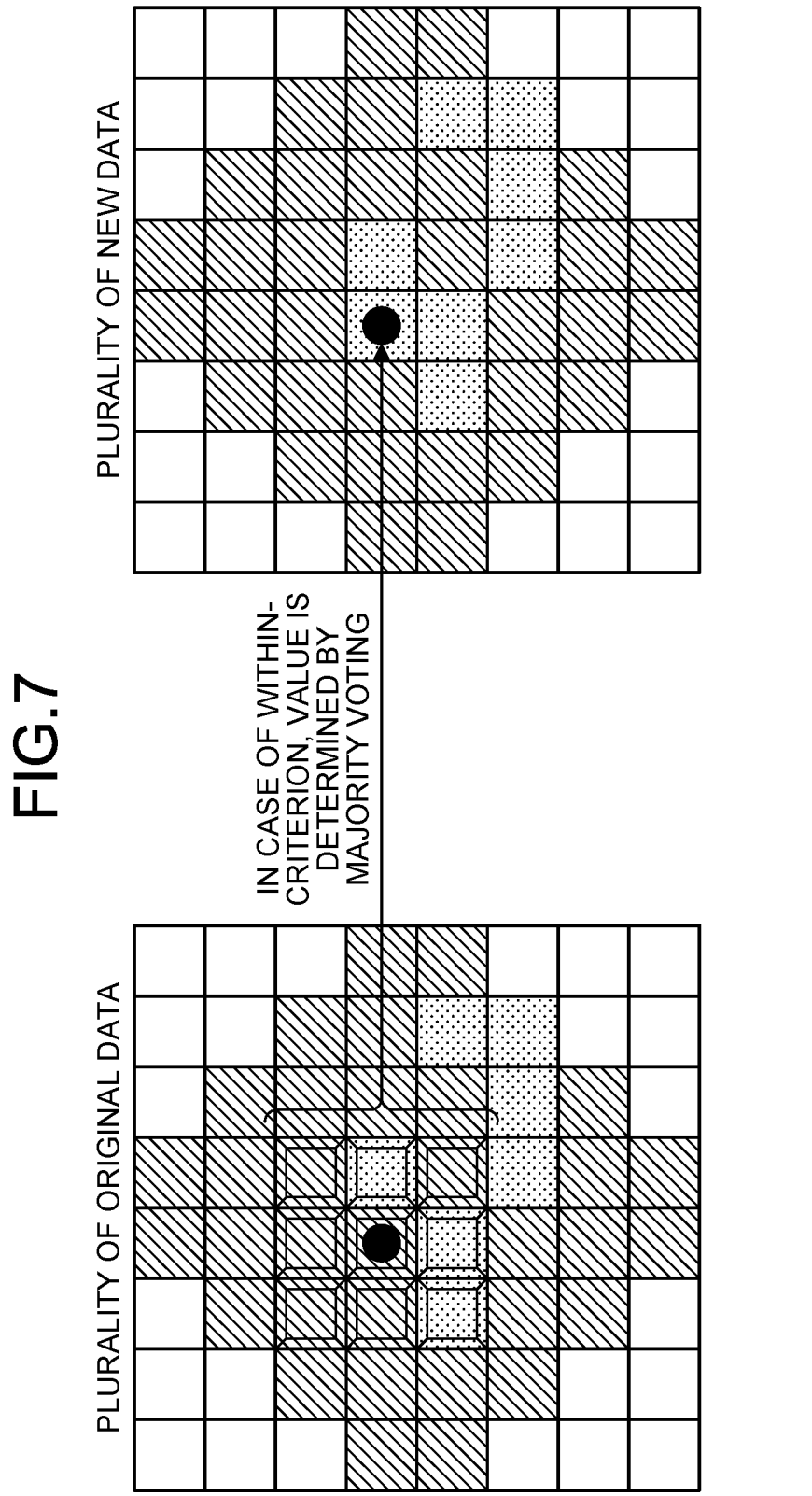
FIG. 7 is a diagram illustrating a conversion rule in a case where an original datum at a target position has a value of within-criterion.
Figure 8:
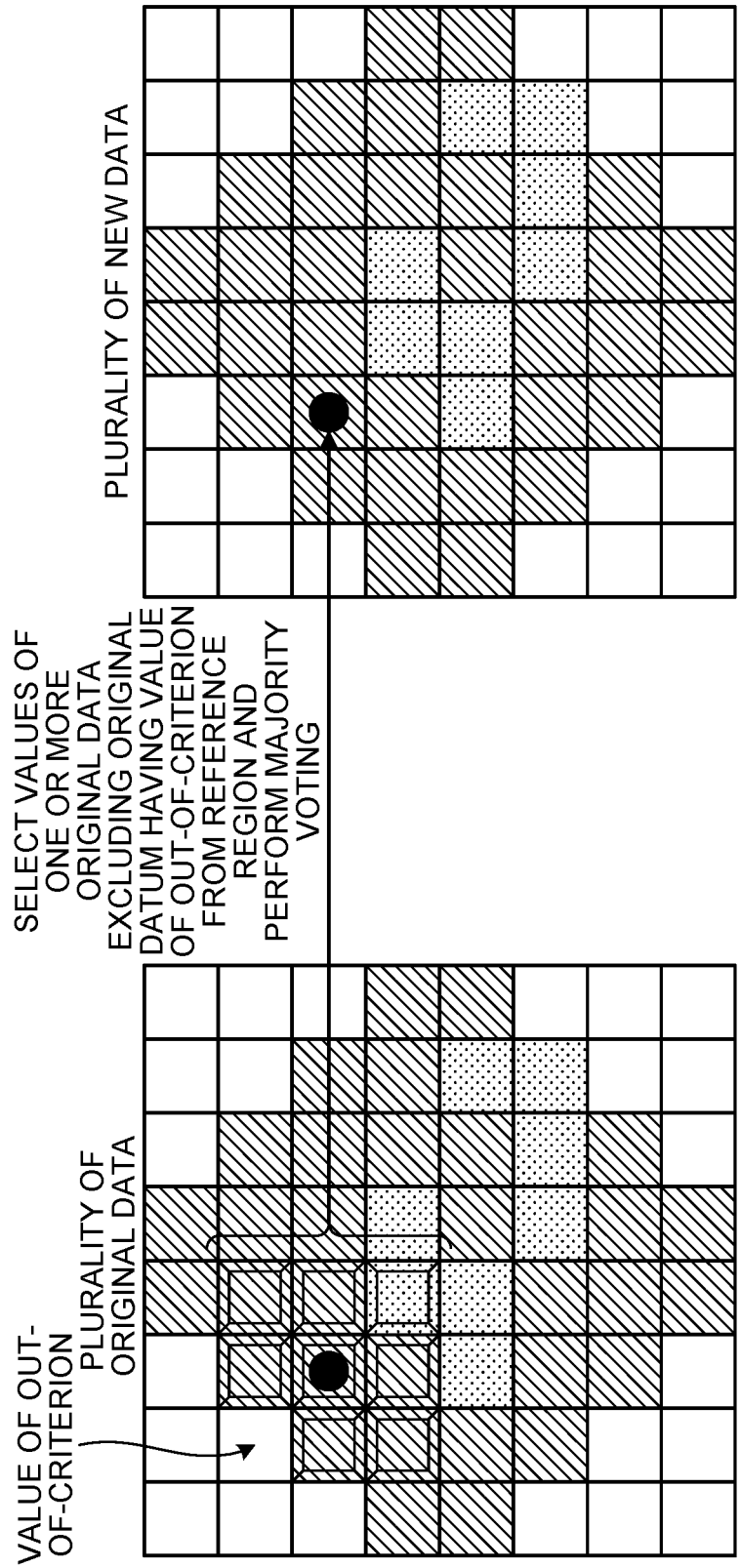
FIG. 8 is a diagram illustrating a conversion rule in a case where an original datum having a value of out-of-criterion is included in a reference region.

FIG. 7 is a diagram illustrating a conversion rule in a case where an original datum at a target position has a value of within-criterion and an original datum having a value of out-of-criterion is not included in the reference region. FIG. 8 is a diagram illustrating a conversion rule in a case where an original datum at a target position has a value of within-criterion and an original datum having a value of out-of-criterion is included in the reference region.

As illustrated in FIGS. 7 and 8, the conversion rule describes that at least in a case where the original datum at the target position has the value of within-criterion, each of values of one or more original data excluding the original datum that has the value of out-of-criterion from two or more original data included in the reference region is selected.

For example, as illustrated in FIG. 7, in a case where the original datum having the value of out-of-criterion is not included in the reference region, the conversion rule selects all of the values of the two or more original data included in the reference region. For example, as illustrated in FIG. 8, in a case where the original datum having the value of out-of-criterion is included in the reference region, the conversion rule selects each of values of one or more original data excluding the original datum that has the value of out-of-criterion among the two or more original data included in the reference region.

The conversion rule describes that majority voting with at least the values of the one or more original data selected is performed, and a new datum at the target position is set to a value determined by the majority voting. For example, the conversion rule describes that in a case where the number of data having a value of 0 among nine data included in a target region is the largest, a value of a new datum at the target position is 0, and in a case where the number of data having a value of 1 is the largest, a value of the new datum at the target position is set to 1.

The conversion rule states that, in a case where a plurality of types of majority values of the one or more original data selected are present, a new datum at the target position is set to a value determined by another algorithm. For example, in a case where the value of within-criterion is either 0 or 1, and as a result of the majority voting, the number of data having a value of 0 and the number of data having a value of 1 are the same, the conversion rule may describe that one predetermined value of 0 or 1 is set to a value of a new datum at the target position.

For example, the conversion rule may describe that in a case where a plurality of types of majority values of the one or more original data selected are present, a value of an original datum at a predetermined position with respect to the target position is added to the values of the one or more original data selected, or a value of an original datum at a predetermined position with respect to the target position is reduced therefrom, and majority voting is performed, whereby the new datum at the target position is set to a value determined by the majority voting. That is, the conversion rule may describe that in the case where a plurality of types of majority values of the one or more original data selected are present, the reference region is changed and majority voting is performed again, and a new datum at the target position is set to a value determined by the majority voting. For example, the conversion rule may describe that in the case where a plurality of types of majority values of the one or more original data selected are present, the value of the original datum at the target position is added to the values of the one or more original data selected, or the value of the original datum at the target position is reduced therefrom, and majority voting is performed, whereby a new datum at the target position is set to a value determined by the majority voting.

The number of data included in the reference region is preferably odd. For example, in a case where the value of within-criterion is 0 or 1, and the number of data included in the reference region is odd, the number of data arrangement patterns in which the winner of the majority voting is 0 is the same as the number of data arrangement patterns in which the winner of the majority voting is 1. However, in the case where the value of within-criterion is 0 or 1, and the number of data included in the reference region is even, as the conversion rule, a rule in a case where the number of data of 0 and the number of data of 1 are the same is described. For example, the conversion rule describes that in the case where the number of data of 0 and the number of data of 1 are the same, the predetermined one of 0 or 1 is the winner. In this case, the number of data arrangement patterns in which the winner of the majority voting is 0 and the number of data arrangement patterns in which the winner of the majority voting is 1 are different from each other, and there is a possibility that the values of the original data can be inversely analyzed from the values of the new data. Therefore, the conversion rule can reduce the possibility of inverse analysis by setting the reference region in which the number of included data is odd.

Figure 9:
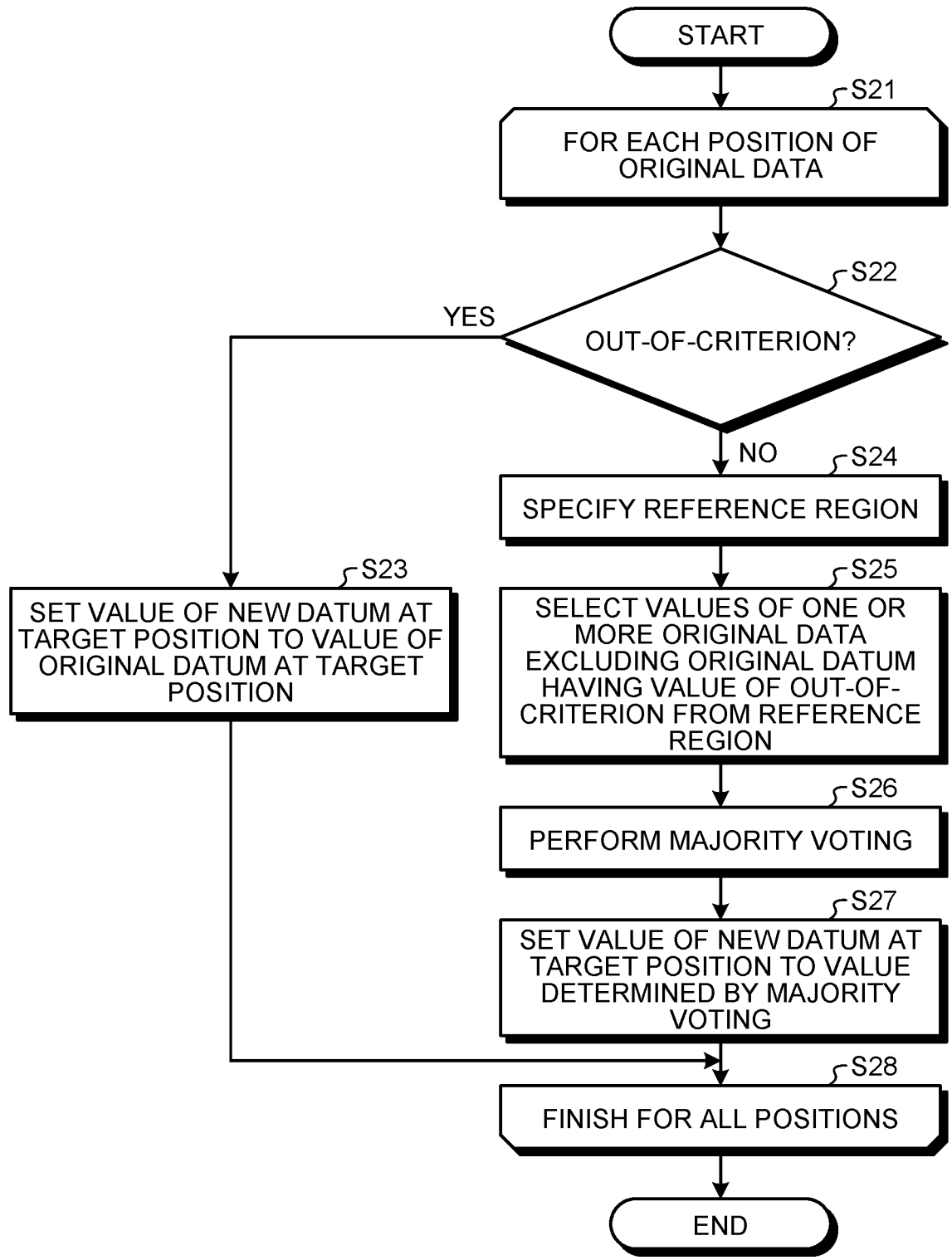
FIG. 9 is a flowchart illustrating a flow of conversion processing.

FIG. 9 is a flowchart illustrating a flow of conversion processing executed by the conversion unit 26. The conversion unit 26 executes the conversion processing according to the conversion rule. In a case where the processing is executed according to the conversion rule, the conversion unit 26 executes processing of S22 to S27 for each position of the original data (loop processing between S21 and S28).

At S22, the conversion unit 26 determines whether or not an original datum at a target position has a value of out-of-criterion. In the present embodiment, the conversion unit 26 determines whether or not the original datum at the target position is −1. In a case where the original datum at the target position has the value of out-of-criterion (Yes at S22), for example, a case where the original datum at the target position is −1, the conversion unit 26 allows the processing to proceed to S23. In a case where the original datum at the target position does not have the value of out-of-criterion (No at S22), for example, a case where the original datum at the target position is 0 or 1, the conversion unit 26 allows the processing to proceed to S24.

At S23, the conversion unit 26 executes processing of setting the value of the new datum at the target position to the value of the original datum at the target position. For example, the conversion unit 26 executes processing of setting the value of the new datum at the target position to −1. When finishing S23, the conversion unit 26 allows the processing to proceed to S28.

At S24, the conversion unit 26 specifies a reference region. The reference region is a predetermined area based on the target position. More specifically, the reference region is a region including at least two or more data and a region continuous with the target position on the map.

Subsequently, at S25, the conversion unit 26 selects each of values of the one or more original data excluding the original datum having the value of out-of-criterion from the two or more original data included in the reference region.

Subsequently, at S26, the conversion unit 26 performs majority voting with the values of the one or more original data selected. For example, the conversion unit 26 compares the number of data having a value of 0 with the number of data having a value of 1 among the one or more original data selected, and decides on a value for which the number is larger.

Subsequently, at S27, the conversion unit 26 executes processing of setting a new datum of the target position to a value determined by the majority voting. In a case where a plurality of types of majority values are present, for example, a case where the number of data having a value of 0 and the number of data having a value of 1 are the same, the conversion unit 26 decides on any one type value by another algorithm, and sets a new datum of the target position to the value determined by the other algorithm. When finishing S27, the conversion unit 26 allows the processing to proceed to S28.

At S28, the conversion unit 26 determines whether or not processing of S22 to S27 has been executed for all of the original data. Then, in a case where the processing of S22 to S27 has been executed for all of the original data, the conversion unit 26 ends this flow.

The conversion unit 26 can convert the first data group into the second data group so as not to affect the analysis such as clustering by executing the processing as described above.

Figure 10:
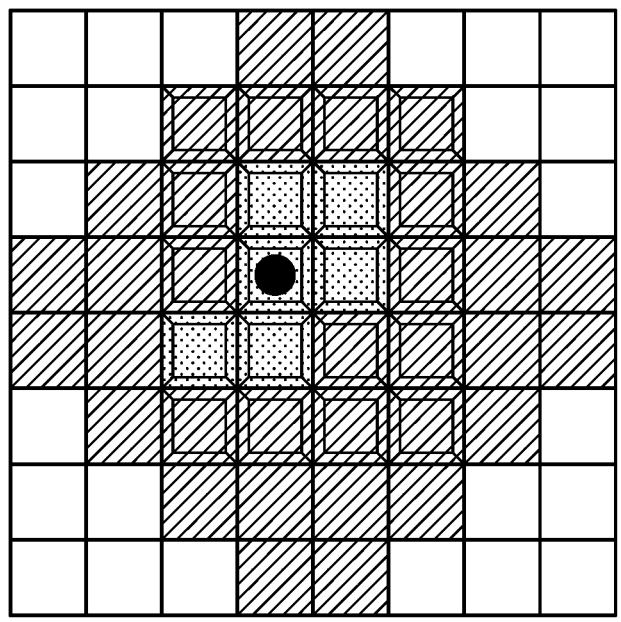
FIG. 10 is a diagram illustrating a first modification of the reference region.

FIG. 10 is a diagram illustrating a first modification of the reference region. The reference region may be any region as long as the region is a predetermined area based on the target position, is a region including at least two or more data, and is continuous with the target position on the map. For example, in a case where the original data are arranged in a two-dimensional matrix-like map, the reference region may be a region the extent of which in a column direction and the extent of which in a row direction are different from each other as illustrated in FIG. 10.

Figure 11:
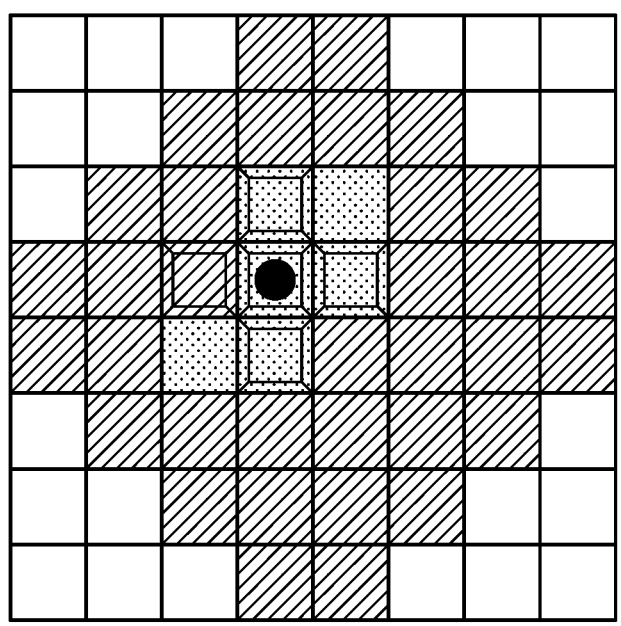
FIG. 11 is a diagram illustrating a second modification of the reference region.

FIG. 11 is a diagram illustrating a second modification of the reference region. For example, in a case where a plurality of original data are arranged in a two-dimensional matrix-like map, the reference region may be a region continuous with the target position in each of the column direction and the row direction, and not continuous in a diagonal direction, as illustrated in FIG. 11. For example, the reference region may be a region including five data that includes a datum at the target position, a datum on the right side of the target position, a datum on the left side of the target position, a datum on the upper side of the target position, and a datum on the lower side of the target position.

Figure 12:
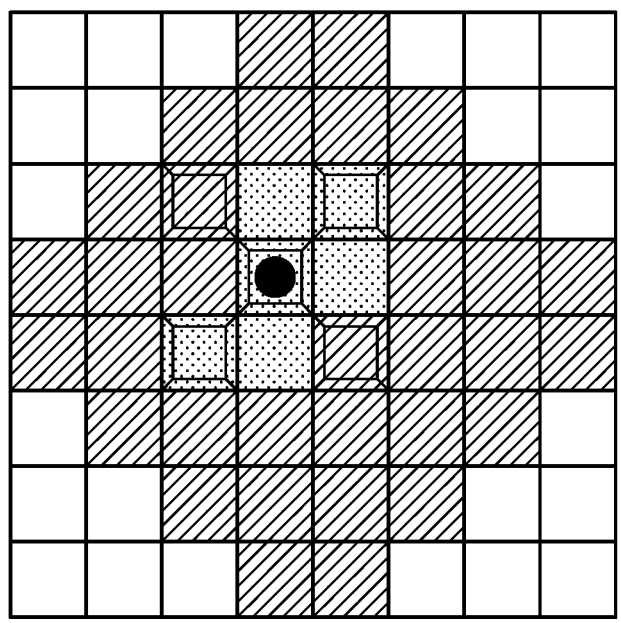
FIG. 12 is a diagram illustrating a third modification of the reference region.

FIG. 12 is a diagram illustrating a third modification of the reference region. For example, in a case where a plurality of original data are arranged in a two-dimensional matrix-like map, the reference region may be a region continuous with the target position in each diagonal direction and not continuous in the column direction or the row direction, as illustrated in FIG. 12. For example, the reference region may be a region including five data that includes a datum at the target position, a datum on the upper diagonal right side of the target position, a datum on the upper diagonal left side of the target position, a datum on the lower diagonal right side of the target position, and a datum on the lower diagonal left side of the target position.

Figure 13:
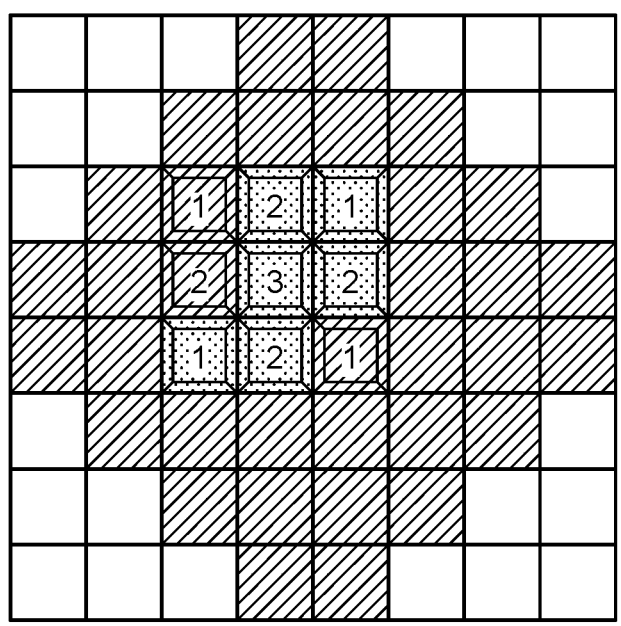
FIG. 13 is a diagram illustrating a modification of majority voting processing.

FIG. 13 is a diagram illustrating a modification of majority voting processing. For example, the conversion rule may describe that a predetermined number of corresponding votes depending on a position in the reference region is allocated to each of two or more data included in the reference region. The conversion rule may describe that majority voting with the total numbers of votes allocated to the values of the one or more original data selected is performed, and the new datum at the target position is set to a value determined by the majority voting.

For example, in a case where a plurality of original data are arranged in a two-dimensional matrix-like map, and the reference region includes a total of nine data present at and around a target position, three votes may be allocated to the target position, two votes may be allocated to each of data in the left-right and up-down directions with respect to the target position, and one vote may be allocated to each of data in a diagonal direction with respect to the target position. In this case, the total number of votes allocated to the reference region is preferably odd.

Figure 14:
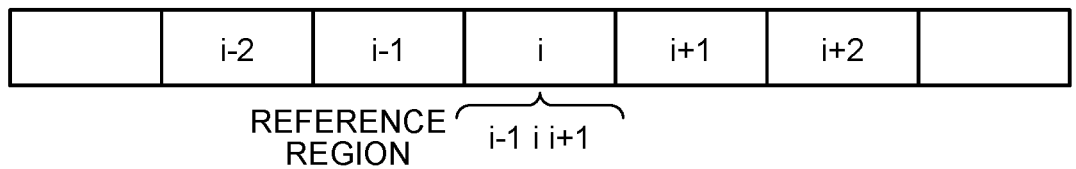
FIG. 14 is a diagram illustrating a plurality of original data and a reference region arranged on a one-dimensional map.

FIG. 14 is a diagram illustrating a plurality of original data and a reference region arranged on a one-dimensional map. The original data and the map on which the original data are arranged may have any configuration as long as it is one or more dimensions. For example, in a case where the original data are arranged on a one-dimensional map, the reference region includes a datum at a target position and a predetermined number of data before and after the target position. For example, in the example of FIG. 14, the reference region includes a datum at a target position (i), a datum at one position before the target position (i−1), and a datum at one position after the target position (i+1).

Figure 15:
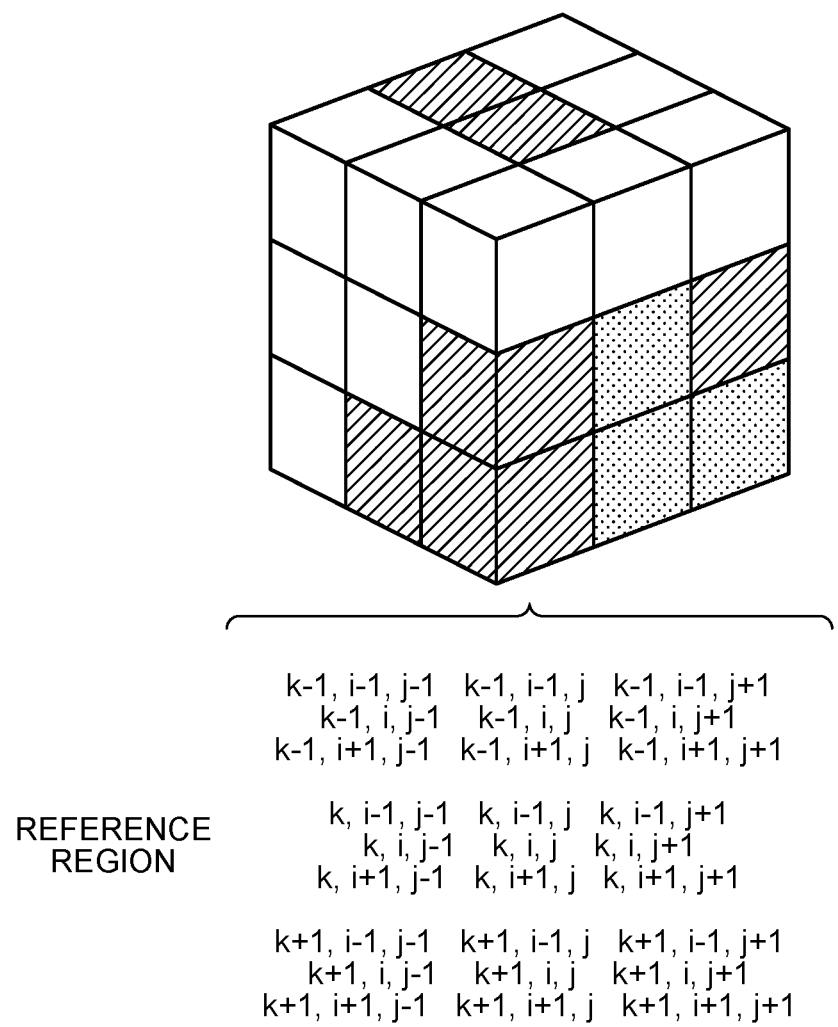
FIG. 15 is a diagram illustrating a plurality of original data and a reference region arranged on a three-dimensional map.

FIG. 15 is a diagram illustrating a plurality of original data and a reference region arranged on a three-dimensional map. For example, in the example of FIG. 15, the reference region includes a datum at a target position (k, i, j) and 26 data around the target position (k, i, j) in three directions.

Figure 16:
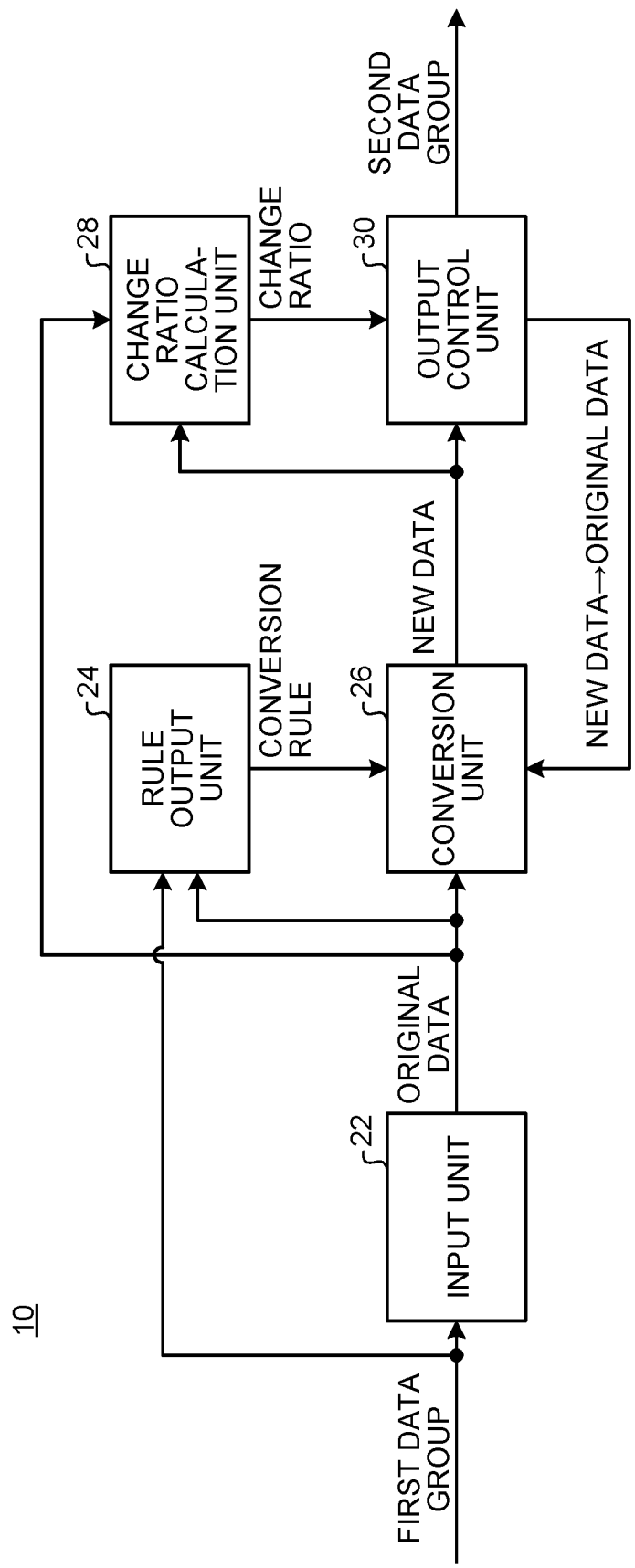
FIG. 16 is a diagram illustrating a functional configuration of a conversion device according to a modification.

FIG. 16 is a diagram illustrating a functional configuration of the conversion device 10 according to a modification. The conversion device 10 may have a configuration as illustrated in FIG. 16.

In the modification, the rule output unit 24 acquires the first data group. Then, the rule output unit 24 outputs, to the conversion unit 26, the conversion rule with a different type for each type of the first data group. For example, the rule output unit 24 may output a conversion rule differing depending on a map type of the first data group. For example, the rule output unit 24 may output a conversion rule differing depending on the total number of data included in the first data group. For example, the rule output unit 24 may output a conversion rule differing depending on types of values that data can take.

In the modification, the rule output unit 24 may output, to the conversion unit 26, the conversion rule with a different type depending on the target position of the datum to be converted. For example, the rule output unit 24 may switch to a conversion rule for a certain number of data and output the conversion rule.

The conversion device 10 as described above can output the second data group that has changed by a predetermined change ratio or larger with respect to the first data group. As a result, the conversion device 10 can conceal the contents of the first data group from a company or the like that acquires the second data group. Furthermore, the conversion device 10 does not change the value in a case where the original datum at the target position has the value of within-criterion. In a case where the original datum at the target position has the value of within-criterion, the conversion device 10 performs majority voting with the values of the one or more original data excluding the original datum that has the value of out-of-criterion from the two or more original data included in the reference region, and sets a new datum at the target position to a value determined by the majority voting. As a result, the conversion device 10 can convert the first data group into the second data group without affecting the analysis such as clustering.

As described above, according to the conversion device 10, the first data group can be appropriately converted into the second data group.

Hardware Configuration

Figure 17:
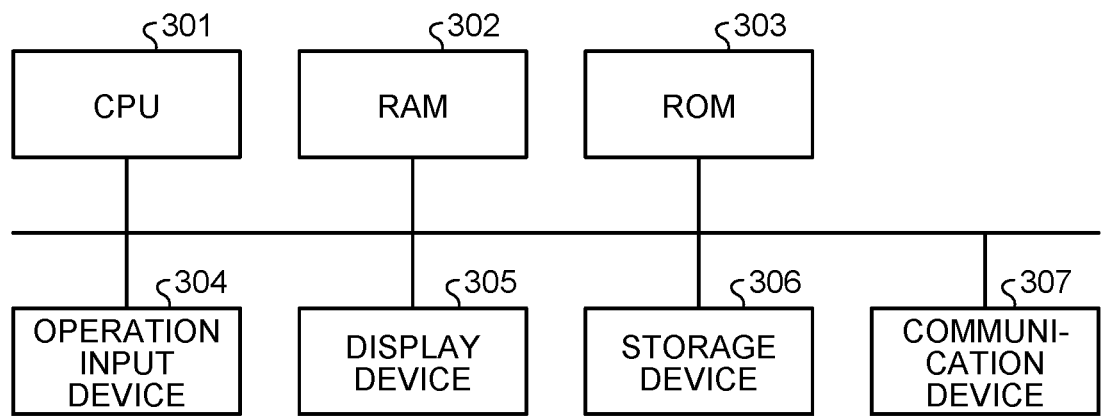
FIG. 17 is a diagram illustrating a hardware configuration of an information processing device.

FIG. 17 is a diagram illustrating an example of a hardware configuration of the conversion device 10 according to the embodiment. The conversion device 10 is implemented by, for example, a computer having a hardware configuration as illustrated in FIG. 17. The conversion device 10 includes a central processing unit (CPU) 301, a random access memory (RAM) 302, a read only memory (ROM) 303, an operation input device 304, a display device 305, a storage device 306, and a communication device 307. Each of these units is connected to each other by a bus.

The CPU 301 is a processor that executes arithmetic processing, control processing, and the like according to a computer program. The CPU 301 executes various types of processing in cooperation with a computer program stored in the ROM 303, the storage device 306, and the like, using a predetermined region of the RAM 302 as a work region.

The RAM 302 is a memory such as a synchronous dynamic random access memory (SDRAM). The RAM 302 functions as a work region of the CPU 301. The ROM 303 is a memory that stores computer programs and various types of information in a non-rewritable manner.

The operation input device 304 is an input device such as a mouse or a keyboard. The operation input device 304 receives information input by an operation by the user as an instruction signal and outputs the instruction signal to the CPU 301.

The display device 305 is a display device such as a liquid crystal display (LCD). The display device 305 displays various types of information based on a display signal transmitted from the CPU 301.

The storage device 306 is a device that writes and reads data to and from a semiconductor storage medium such as a flash memory, a magnetically or optically recordable storage medium, or the like. The storage device 306 writes and reads data to and from a storage medium in response to control from the CPU 301. The communication device 307 communicates with external devices through a network in response to control from the CPU 301.

A conversion program executed by the computer has a modular configuration including an input module, a rule output module, a conversion module, a change ratio calculation module, and an output control module. This computer program is loaded on the RAM 302 and executed by the CPU 301 (processor), and causes the computer to function as the input unit 22, the rule output unit 24, the conversion unit 26, the change ratio calculation unit 28, and the output control unit 30. A part or all of the input unit 22, the rule output unit 24, the conversion unit 26, the change ratio calculation unit 28, and the output control unit 30 may be implemented by a hardware circuit.

The computer program executed by the computer is provided as a file in a form installable or executable on the computer, in a manner recorded in a storage medium that can be read by the computer, such as a CD-ROM, a flexible disk, a CD-R, or a digital versatile disc (DVD).

This computer program may be provided such that the computer program is stored in a computer connected to a network such as the Internet and downloaded through the network. In addition, this computer program may be provided or distributed through a network such as the Internet. Furthermore, the computer program executed by the conversion device 10 may be provided such that the computer program is incorporated into the ROM 303 or the like in advance.

While a certain embodiment have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device that converts a first data group including a plurality of data arranged on a preset n-dimensional wafer map, n being an integer of 1 or larger, into a second data group including a plurality of data arranged on the wafer map, the device comprising:
   a hardware processor configured to:
   acquire the first data group as a plurality of original data;
   output a conversion rule;
   convert the plurality of original data into a plurality of new data arranged on the wafer map according to the conversion rule; and
   output the plurality of new data as the second data group,
   wherein
   each of the plurality of original data and the plurality of new data has any one of three values of a first value indicating that a chip is not produced at a corresponding position in the wafer map, a second value indicating that a chip produced at the corresponding position is non-defective, and a third value indicating that a chip produced at the corresponding position is defective,
   the hardware processor is further configured to, in the conversion, select each of a plurality of positions of the plurality of original data arranged on the wafer map as a target position,
   the conversion rule defines a reference region that is a predetermined area based on the target position, and
   the hardware processor is further configured to:
   in the conversion, in a case where an original datum at the target position has the first value, set a new datum at the target position to the value of the original datum at the target position, and
   in a case where the original datum at the target position has the second value or the third value, select each of values of one or more original data excluding an original datum that has the first value from two or more original data included in the reference region to perform majority voting with the values of the one or more original data selected, and set the new datum at the target position to majority values determined by the majority voting, among the one or more original data selected.

2. The device according to claim 1, wherein
   the hardware processor is further configured to calculate a change ratio representing a ratio of a number of data having a value that is changed in the conversion among the plurality of new data to a number of data included in the first data group, and
   the hardware processor is further configured to:
   in a case where the change ratio is smaller than a preset value, repeat the conversion to convert the original data into the new data using the new data as the original data until the change ratio is equal to or larger than the preset value, and
   in outputting of the plurality of new data, in a case where the change ratio is equal to or larger than the preset value, output the new data as the second data group.

3. The device according to claim 1, wherein the reference region is a region continuous with the target position on the map.

4. The device according to claim 1, wherein a number of original data included in the reference region is odd.

5. The device according to claim 1, wherein the hardware processor is further configured to, in the conversion, in a case where a plurality of types of the majority values of the one or more original data selected are present, add the value of the original datum at the target position to the values of the one or more original data selected, or reduce the value of the original datum at the target position to newly perform majority voting, and set the new datum at the target position to majority values determined by the newly performed majority voting among the one or more original data to which or from which the value is added or reduced.

6. The device according to claim 1, wherein the hardware processor is further configured to, in the conversion, in a case where a plurality of types of the majority values of the one or more original data selected are present, add a value of an original datum at a predetermined position with respect to the target position to the values of the one or more original data selected, or reduce a value of an original datum at a predetermined position with respect to the target position to newly perform majority voting, and set the new datum at the target position to majority values determined by the newly performed majority voting among the one or more original data to which or from which the value is added or reduced.

7. The device according to claim 1, wherein, in the conversion, the hardware processor is further configured to allocate a predetermined number of corresponding votes depending on a position in the reference region to each of two or more data included in the reference region, to perform majority voting with total numbers of votes allocated to the values of the one or more original data selected, and set the new datum at the target position to majority values determined by the majority voting among the one or more original data.

8. The device according to claim 1, wherein, in outputting of the conversion rule, the hardware processor is configured to output the conversion rule for which the reference region differs for each type of the first data group.

9. The device according to claim 1, wherein, in outputting of the conversion rule, the hardware processor is configured to output the conversion rule for which the reference region differs depending on the target position.

10. An information processing method of converting a first data group including a plurality of data arranged on a preset n-dimensional wafer map, n being an integer of 1 or larger, into a second data group including a plurality of data arranged on the wafer map by an information processing device, the method comprising:
    acquiring the first data group as a plurality of original data by the information processing device;

outputting a conversion rule by the information processing device;

converting the plurality of original data into a plurality of new data arranged on the wafer map according to the conversion rule by the information processing device; and outputting the plurality of new data as the second data group by the information processing device, wherein each of the plurality of original data and the plurality of new data has any one of three values of a first value indicating that a chip is not produced at a corresponding position in the wafer map, a second value indicating that a chip produced at the corresponding position is non-defective, and a third value indicating that a chip produced at the corresponding position is defective, the converting includes selecting each of a plurality of positions of the plurality of original data arranged on the wafer map as a target position, the conversion rule defines a reference region that is a predetermined area based on the target position, and the converting includes:

in a case where an original datum at the target position has the first value, setting a new datum at the target position to the value of the original datum at the target position, and in a case where the original datum at the target position has the second value or the third value, selecting each of values of one or more original data excluding an original datum that has the first value from two or more original data included in the reference region to perform majority voting with the values of the one or more original data selected, and setting the new datum at the target position to majority values determined by the majority voting, among the one or more original data selected.

11. A computer program product comprising a computer-readable medium including programmed instructions, the instructions causing a computer to function as an information processing device that converts a first data group including a plurality of data arranged on a preset n-dimensional wafer map, n being an integer of 1 or larger, into a second data group including a plurality of data arranged on the wafer map, the instructions causing the computer to function as:

an input unit that acquires the first data group as a plurality of original data;

a rule output unit that outputs a conversion rule;

a conversion unit that converts the plurality of original data into a plurality of new data arranged on the wafer map according to the conversion rule; and an output control unit that outputs the plurality of new data as the second data group, wherein each of the plurality of original data and the plurality of new data has any one of three values of a first value indicating that a chip is not produced at a corresponding position in the wafer map, a second value indicating that a chip produced at the corresponding position is non-defective, and a third value indicating that a chip produced at the corresponding position is defective, the conversion unit selects each of a plurality of positions of the plurality of original data arranged on the wafer map as a target position, the conversion rule defines a reference region that is a predetermined area based on the target position, and the conversion unit in a case where an original datum at the target position has the first value, sets a new datum at the target position to the value of the original datum at the target position, and in a case where the original datum at the target position has the second value or the third value, selects each of values of one or more original data excluding an original datum that has the first value from two or more original data included in the reference region to perform majority voting with the values of the one or more original data selected, and sets the new datum at the target position to majority values determined by the majority voting, among the one or more original data selected.

* * * * *